(12) United States Patent
Bayards et al.

(10) Patent No.: US 6,291,581 B1
(45) Date of Patent: Sep. 18, 2001

(54) POWDER PAINT BINDER COMPOSITION

(75) Inventors: Richard A. Bayards, Zwolle; Evert S De Jong, Dalfsen; Saskia Udding-Louwrier, Zwolle, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/522,764

(22) Filed: Mar. 8, 2000

Related U.S. Application Data

(63) Continuation of application No. PCT/NL98/00475, filed on Aug. 21, 1998.

(30) Foreign Application Priority Data

Sep. 17, 1997 (NL) .................................. 1007052

(51) Int. Cl.$^7$ .................................. C08G 63/48
(52) U.S. Cl. .................................. 525/28; 523/526
(58) Field of Search .................................. 525/28

(56) References Cited

U.S. PATENT DOCUMENTS 5,703,198 * 12/1997 Twigt .................................. 528/303
5,789,039 * 8/1998 Biller .................................. 427/508

FOREIGN PATENT DOCUMENTS

| 2157658 | 3/1996 | (CA) . |
|---|---|---|
| 0356847 A | 9/1993 | (EP) . |
| 0580219 A1 | 1/1994 | (EP) . |
| WO9319132 A | 9/1993 | (WO) . |

* cited by examiner

Primary Examiner—Paul R. Michl
(74) Attorney, Agent, or Firm—Pillsbury Winthrop LLP

(57) ABSTRACT

The invention relates to a radiation curable binder composition for powder paint formulations.

The binder composition comprises:
a) a solid polymer with an amount of unsaturation of between 300 and 1800 g per mole of unsaturated group (WPU) and with a molecular weight (Mn) of between 800 and 5000 g per mole and
b) a crosslinker comprising units of a prepolymer having a molecular weight (Mn) higher than 400 and units of a vinyl ether or an unsaturated alcohol, the number of polymerizable unsaturations of the crosslinker being higher than or equal to 2.

14 Claims, No Drawings

POWDER PAINT BINDER COMPOSITION

This is a Continuation of: International Appln. No. PCT/NL98/00475 filed Aug. 21, 1998 which designated the U.S.

The invention relates to a powder paint binder composition and to a radiation curable powder paint formulation comprising this binder composition.

As is evident from Powder Coatings Bulletin, 1996, 10, pp. 6–8, there is a market demand for radiation-curable powder paint formulations that can be cured on metal.

It is the object of the invention to provide a radiation-curable powder paint binder composition, which comprises a polymer and optionally a crosslinker, that results in a powder coating with good properties, such as for instance a good storage stability and a viscosity at a relatively low curing temperature that is so low that a good flow can be obtained, and that also results in a powder paint binder formulation that can be cured on metal.

The invention is characterized in that the powder paint composition comprises:
a) a polymer with an amount of unsaturation of between 300 and 1800 g per mole of unsaturated group (WPU) and with a molecular weight (Mn) of between 800 and 5000 g per mole and
b) a crosslinker comprising units of a prepolymer having a molecular weight (Mn) higher than 400 and units of a vinyl ether or an unsaturated alcohol, the number of polymerizable unsaturations of the crosslinker being higher than or equal to 2.

The compounds a) and b) are solid at 20° C.

The powder paint binder composition according to the invention results in a powder paint having sufficient adhesion and flexibility for application on metal substrates and exhibits very good storage or powder stability, processing properties and good flow properties.

Other required properties, such as, for instance, chemical resistance, toughness, color stability and scratch resistance, are also obtained.

A powder paint formulation comprising the binder composition according to the invention can also be applied on other substrates such as for instance wood, chipboard, MDF (medium density fiber board), paper and plastic.

A major practical advantage of the binder composition according to the invention is the combination of fast curing and the absence of emissions of volatile organic compounds.

Another major advantage of the composition according to the invention is the possibility of using powder paint on a metal object that because of its size cannot entirely be heated at a high temperature in one operation. Consequently it is possible to coat very large metal substrates and assembled objects (containing metal as well as for example plastic).

Generally the degree of polymerizable unsaturation in the polymer a)—expressed as WPU—ranges from about 145 to about 3000 grams per mole of unsaturated group (WPU), and preferably from about 300 to about 1800 grams of polymer per mole of unsaturated group. The unsaturated groups may be positioned both within the chain and at the end of the chain.

The molecular weight (Mn) generally ranges from 800 to 5000 and preferably from 2000 to 4500. Mn is determined by means of gel permeation chromatography (GPC) using a polystyrene standard.

Preferably, the polymer (a) is an unsaturated polyester and/or an unsaturated polyacrylate.

If the polymer is an unsaturated polyester, the amount of unsaturation is preferably between 300 and 1800 grams per mole of unsaturated group (WPU) and the molecular weight (Mn) is preferably between 800 and 5000 grams per mole.

The polymer a) and the crosslinker b) can be either (semi)crystalline or amorphous. Depending on the required application, a mixture of crystalline and amorphous compounds can be selected in which the optimum balance of flow and processing properties can be obtained through the choice of the weight ratio.

The glass transition temperature (Tg) of an amorphous polyester generally ranges between 25° C. and 100° C., and preferably between about 30° C. and about 80° C.

The melting point of a crystalline unsaturated polyester and of a crystalline crosslinker generally lies between 35° C. and 180° C., preferably between 50° C. and 120° C.

A general description of powder coatings on the basis of unsaturated polyesters can be found on pages 167–170 of Powder Coatings, Chemistry and Technology, by Misev (Wiley; 1991).

The preparation of the unsaturated polyester can for instance take place in one step, with (un)saturated acids and glycols being heated at, for instance, between about 180° C. and about 230° C. for, between about, 6 and about 15 hours.

Preparation by means of a two-step process, with saturated glycols and acids being esterified at, for instance, 230–250° C. for, for instance, 2 to 8 hours in the first step, and saturated compounds and/or unsaturated glycols and acids being esterified at, for instance, 180–220° C. for, for instance, 2 to 8 hours in the second step, is also possible.

The unsaturated polyester is generally composed of one or more aliphatic and/or cycloaliphatic, mono-, di- and/or polyhydric alcohols and one or more aliphatic, cycloaliphatic and/or aromatic di- or polycarboxylic acids and, if desirable, monocarboxylic acids and/or esters derived therefrom.

Examples of suitable alcohols are benzyl alcohol, ethylene glycol, 1,2-propylene glycol, 1,3-propylene glycol, neopentyl glycol, butane diol, hexane diol, dimethylol cyclohexane, diethylene glycol, glycerol, trimethylol propane, pentaerythritol and/or dipentaerythritol.

Instead of or besides the alcohol compound(s) one or several epoxy compounds such as, for instance, ethylene oxide, propylene oxide, epoxides (for instance Cardura™), triglycidyl isocyanurate, carbonates such as, for instance, ethylene carbonate and propylene carbonate and/or allyl glycidyl ether can be used.

Examples of suitable di- or polycarboxylic acids are maleic acid, fumaric acid, itaconic acid, citraconic acid, malonic acid, succinic acid, glutaric acid, adipic acid, sebacic acid, 1,4-cyclohexane dicarboxylic acid, hexahydrophthalic acid, hexachloroendomethylene tetrahydrophthalic acid, dichlorophthalic acid, isophthalic acid, terephthalic acid and/or trimellitic acid. The carboxylic acid can also be used in the form of an anhydride, for instance tetrahydrophthalic anhydride, maleic anhydride or phthalic anhydride.

If desired the unsaturated polyester may also contain saturated or unsaturated monocarboxylic acids, such as synthetic and/or natural fatty acids with 2 to 36 carbon acids or esters prepared from these carboxylic acids and polyhydric alcohols such as glycerol. Examples of suitable monocarboxylic acids are lauric acid, stearic acid, oleic acid, linolic acid, benzoic acid, acrylic acid and/or methacrylic acid. The unsaturated polyester may also contain dicyclopentadiene.

As unsaturated carboxylic acid use is preferably made of fumaric acid and/or maleic acid.

For the preparation of polyesters having a sufficient degree of crystallinity it is desirable, though not necessary, for the (di) acids and (di) ols used in the polycondensation to contain an even number of carbon atoms. Aromatic and/or aliphatic cyclic diacids and diols in which the functional groups are parapositioned relative to each other, such as, for instance, terephthalic acid, cyclohexane dicarboxylic acid and dimethyl cyclohexane generally promote the crystallinity.

The monomers for the synthesis of (semi)crystalline polyesters preferably comprise diols and diacids with an even number of carbon atoms, such as, for instance, terephthalic acid, isophthalic acid, adipic acid and cyclohexane dicarboxylic acid, hexane diol, butane diol, ester diol and dimethylol cyclohexane.

The preparation of (semi)crystalline polyesters is described in, for instance, WO-A-91-14745.

Hydroxyl-functional unsaturated polyesters usually have a hydroxyl number between 5 mg KOH/gram of resin and 75 mg KOH/gram of resin and preferably a hydroxyl number of between 25 mg KOH/gram of resin and 60 mg KOH/gram of resin. The acid number is as a rule lower than 10 mg KOH/gram of resin and is preferably chosen as low as possible.

Acid-functional unsaturated polyesters usually have an acid number of between 15 mg KOH/gram of resin and 75 mg KOH/gram of resin, and preferably an acid number of between 25 mg KOH/gram of resin and 45 mg KOH/gram of resin.

Examples of suitable acrylate polymers are acrylate polymers containing several side chains with unsaturated groups. These polymers can be obtained by means of a two-step process. In a first step an acrylate polymer is prepared using the customary polymerization process, with also a certain proportion of functional monomer being copolymerized. This functional monomer, which is usually present in amounts ranging from 3 to 60 wt. %, may for instance be epoxy functional, acid functional or isocyanate functional.

In the second step then an addition reaction is carried out between the functional groups of the acrylate polymer from the first step and a compound containing a group capable of reacting with the functional groups and also containing an unsaturated group in the side chain.

In this reaction in the second step the functional acrylate resin can be dissolved in a solvent such as, for instance, toluene, xylene or butyl acetate. The compound containing an unsaturated group capable of reacting with the functional polymer is added at temperatures of between, for instance, 50° C. and 150° C. Stirring is then continued for some hours. The progress of the reaction can be monitored by means of titrations of, for instance, acid groups or isocyanate groups.

Possible addition reactions in the second step are, for instance, reactions between an acid group and an epoxy-functional acrylate polymer, a hydroxyl group and an isocyanate-functional acrylate polymer, an isocyanate group and a hydroxy-functional acrylate polymer, an anhydride group and a hydroxyl-functional acrylate polymer or an epoxy group and an acid-functional acrylate polymer.

Preferably the reaction between an epoxy-functional acrylate polymer and (meth)acrylic acid is used.

The side chain with unsaturated groups can thus be formed by, for instance, anhydrides containing unsaturated groups, (meth)acrylate groups, allyl groups, vinyl groups and vinylether groups. Suitable examples of compounds with unsaturated groups are (meth)acrylic acid, glycidyl (meth) acrylate, TMI, allyl glycidyl ether, hydroxybutyl vinyl ether and maleic anhydride.

The acrylate polymers can also be obtained by a multistep process. In a multi-step process one of the isocyanate groups of a diisocyanate compound (for instance isophorone diisocyanate, hexane diisocyanate or methylene biscyclohexylisocyanate) can, for instance, be reacted with a hydroxy-functional (meth)acrylate monomer. The resulting compound, which contains an isocyanate group and a (meth) acrylate group, can then be reacted with a hydroxy-functional polymer such as, for instance, an acrylate polymer which contains hydroxyethyl methacrylate as functional monomer.

The crosslinker b) comprises units of a prepolymer having a molecular weight (Mn) higher than 400 and units of a vinyl ether or an unsaturated alcohol, the number of polymerizable unsaturations of the crosslinker being higher than or equal to 2.

Preferably, the prepolymer of crosslinker b) is a lineair prepolymer.

Because of the relatively large distance in the crosslinker between the vinylether or unsaturated alcohol groups at the end of the chain, the flexibility of the cured coating is improved.

The prepolymer can be either saturated or unsaturated.

The functional prepolymer can, for instance, be a polyester, polyacrylate, polyolefin, polyurethane or epoxy resin. Preferably the prepolymer is a saturated polyester and/or unsaturated polyester and/or polyacrylate.

According to a preferred embodiment of the invention the prepolymer is a hydroxyl functional prepolymer, an acetoacetate functional prepolymer, an epoxy functional prepolymer, an acid functional prepolymer, an isocyanate functional prepolymer or an ester functional prepolymer.

According to another preferred embodiment of the invention the powder paint binder composition substantially comprises:

a) a polymer having a degree of unsaturation between about 300 and about 1800 grams of polymer per mole of unsaturated group inclusive of the unsaturated group (WPU) and with a molecular weight (Mn) of between 800 and 5000 grams per mole and b) a crosslinker comprising the reaction product of a hydroxy-functional prepolymer, a (poly)isocyanate and a vinyl ether or an unsaturated alcohol wherein the number of polymerizable unsaturations of the crosslinker is higher than or equal to 2.

The crosslinker can be obtained, for instance, by reaction of the components in the presence of a catalyst such as, for instance, dibutyl tin laurate. The reaction can optionally take place in bulk or in a suitable solvent such as, for instance, chloroform, ethyl acetate, butyl acetate, toluene, xylene or benzene at temperatures ranging from 70° C. to 150° C. The order of addition can be varied depending on the end product that is desired.

The number of polymerizable unsaturations of the crosslinker is higher than or equal to 2, is generally between 2 and 10, and is preferably 2–4.

The crosslinker can be either linear or branched. The WPU of the crosslinker generally ranges between about 200 to about 1500.

The molecular weight (Mn) of the hydroxyl-functional prepolymer generally ranges from about 200 to about 2500.

The polyesters can be prepared using a customary process by esterification or transesterification of the customary polyalcohols and polycarboxylic acids, optionally in the presence of customary esterification catalysts such as, for instance, dibutyl tin oxide or tetrabutyl titanate.

In case of a hydroxyfunctional prepolymer, the preparation conditions and the COOH/OH ratio are preferably chosen so that the end products have a hydroxyl number ranging from 25 to 150 mg KOH/gram of resin.

A preferred crosslinker is the reaction product of a hydroxyl-functional prepolymer, a (poly) isocyanate and a functional vinyl ether or an unsaturated alcohol.

Examples of suitable (poly)isocyanates include isophorone diisocyanate (IPDI), toluene diisocyanate, p- and m-phenylene diisocyanate, 1,4-tetramethylene diisocyanate, 1,6-hexamethylene diisocyanate (HDI), 2,2,4-trimethyl hexamethylene diisocyanate, 1,4-cyclohexane diisocyanate, 4,4' dicyclohexyl methane diisocyanate, 4,4'-diphenylmethane diisocyanate, 1,5-tetrahydronaphthalene diisocyanate, naphthalene-1,5'-diisocyanate, 5-bis(2-methyl-3-isocyanate phenyl)methane, 4,4'-diphenylpropane diisocyanate tetramethyl xylene diisocyanate, 3,4 -isocyanate methyl-1-methyl cyclohexyl isocyanate (IMCI), as well as higher functional isocyanate-functional oligomers of these isocyanates such as, for instance, isocyanurates, uretdiones and biurets.

Preferably the isocyanate is IMCI, IPDI or HDI.

Suitable functional vinyl ethers are, for instance, hydroxyvinyl ethers and aminovinyl ethers.

Examples of suitable hydroxyvinyl ethers include hydroxyvinyl ethers with (2–10) C atoms. Preferably the hydroxy vinylether is hydroxybutyl vinyl ether, hydroxyethyl vinyl ether, 4-hydroxymethyl cyclohexyl methyl vinyl ether, triethylene glycol monovinyl ether or diethylene glycol monovinyl ether.

An example of a suitable amino vinyl ether is aminopropyl vinyl ether.

The acid-, acetoacetate-, isocyanate-, epoxy- and ester functional prepolymers preferably react with an aminovinylether. Furthermore, the ester and isocyanate functional prepolymers preferably react with a hydroxyvinylether.

Examples of suitable unsaturated alcohols are allyl alcohol and crotyl alcohol, which in the presence of a hydroxy polymer react with isocyanate to form an allyl- or crotyl-functionalized crosslinker. With the aid of, for instance, a rutene catalyst this crosslinker can then be converted into an alkenyl compound such as, for instance, 1-propenyl ether and 1-butenyl ether (Crivello, Pol. Mat. Sc. and Eng. 1995, Vol. 72, page 473).

Hydroxyvinyl ether and allyl alcohol are preferred.

Most preferably the crosslinker comprises units of a hydroxyfunctional prepolymer, a (poly)isocyanate and a vinylether.

The selected ratio between a) and b) in the binder composition depends in part on the choice of b).

If b) is vinylether-functionalized, the unsaturation a): unsaturation b) equivalent ratio generally ranges from about 1:2 to about 2:1, a ratio of virtually 1:1 being preferred.

If allyl- or alkenyl-functional compounds are used as b), the unsaturation a): unsaturation b) equivalent ratio generally ranges from about 1:2 to about 2:1.

Combinations of vinyl compounds and allyl-functional crosslinkers can also be used.

It is also possible to use crosslinker b) in combination with a crosslinker c).

Preferably, the crosslinker c) comprises ethylenically unsaturated units. Suitable units include, for example, vinylether, allylether, allylurethane, fumarate, maleate, itaconate or unsaturated (meth)acrylate units. Suitable unsaturated (meth)acrylates are, for example, unsaturated urethane(meth)acrylates, unsaturated polyester(meth) acrylates, unsaturated epoxy(meth)acrylates and unsaturated polyether(meth)acrylates.

According to a further preferred embodiment of the invention the powder paint binder composition comprises as crosslinker c) the crosslinker as disclosed in U.S. Pat. No. 5,703,198.

A preferred powder paint binder composition comprises:
a) a polymer with an amount of unsaturation of between 300 and 1800 g per mole of unsaturated group (WPU) and with a molecular weight (Mn) of between 800 and 5000 g per mole,
b) a crosslinker comprising units of a hydroxy-functional prepolymer, a (poly)isocyanate and a vinyl ether or an unsaturated alcohol, the number of polymerizable unsaturations of the crosslinker being higher than or equal to 2 and
c) a crosslinker having at least two functional groups selected from the group consisting of vinyl ether, vinylester and (meth)acrylate functional groups.

The crosslinking agent c) is preferably based on a divinyl ether functionalized urethane comprising units of, for example, hexanediisocyanate and hydroxybutyl or hydroxyethyl vinyl ether.

Preparation of vinyl ether functionalized diurethanes can be carried out by means of the process described in for example EP-A-505,803.

This crosslinking agent c) preferably contains between about 1 to 10 vinyl groups, and more preferably, contains at least two vinyl groups per molecule.

The crosslinking agent c) can be a liquid or a solid. Solid crosslinking agents are preferred because a good powder stability is more easily achieved.

The ratio between the crosslinkers can be selected depending on the desired application, especially with regard to flexibility and hardness. The weight ratio of crosslinkers b): c) can range between 99:1 and 1:99.

A radiation-curable system can comprise a resin, a crosslinker, a photoinitiator, a flow agent and pigments.

Radiation curing of the binder composition according to the invention preferably takes place through UV and EB curing. These methods are described in more detail in, for instance, the article "UV and EB-curing" by S. J. Bett et al. in JOCCA 1990 (11), pp. 446–453.

The composition according to the invention is cured by radical polymerization. Compared with cationic UV polymerization this has the advantage that curing is not affected by moisture and proceeds completely almost at once (no dark reaction needed).

For the UV radiation curing of the powder paint formulation a photoinitiator can, at a temperature ranging from, for instance, 40° C. to 120° C., be mixed with a binder composition according to the invention. Mixing can take place both in a solvent and in the melt, for instance in an extruder or in a static mixer. Further, pigments and the desired auxiliary materials such as, for instance, flow agents can be added. The paint can subsequently be applied to the substrate or be sprayed electrostatically. After application, the powder paint is molten at temperatures ranging from, for instance, 40° C. to 170° C. by being placed in an oven, exposure to infra-red radiation, or a combination of both, so that a closed, smooth coating film is formed with a layer thickness ranging from, for instance, 20 to 200 μm, after which the still warm panel is cured under a UV light source. Afterwards post-heating may take place.

Examples of suitable photoinitiators are described in Volume 3 "Photoinitiators for free radical and cationic polymerisation" of "Chemistry and Technology of UV and EB formulations" by K. Dietliker (1991; SITA Technology Ltd., London).

Photoinitiators initiate curing of the compositions according to the invention upon exposure to light. Suitable initiators for radical polymerizations are ketonic and may be aromatic such as, for instance, benzophenone. Irgacure 184® (Ciba) is an aryl ketone with hydroxycyclohexyl-phenyl-ketone as active component and is, like Irgacure 369® (active component 2-benzyl-2-dimethylamino-1-(4-morpholinophenyl)-butanone-1), a suitable photoinitiator. Acyl phosphine, such as 2,4,6-trimethyl benzoyl diphenyl phosphine oxide (Lucerine TPO®, BASF) can also be used. Chemical derivatives of this photoinitiator are also suitable, as are combinations of these initiators. A suitable combination of photoinitiators is formed by Irgacure 1800® (Ciba), which consists of 75 wt. % Irgacure 184® and 25 wt. % (bis (2,6-dimethoxy benzoyl)-2,4,4-trimethylpentyl phosphine oxide).

The binder composition according to the invention can also yield a good coating after thermal curing under the influence of a latent catalyst such as, for instance, a peroxide. Thermal curing can take place at temperatures ranging from, for instance, about 80° C. to about 200° C., depending on the selected polymers.

The powder paint composition, according to the invention, is very suitable for application on metal, but can also be applied on other substrates such as, for instance, plastics, wood, paper, cardboard and glass if the melting point of the binder system is low enough.

Examples of customary additives in the paint formulations are pigments, emulsifiers, preservatives, light stabilizers, UV absorption agents, flow agents, degassing agents, fillers, stabilizers and/or catalysts.

The addition of unsaturated or saturated acrylates to the binder composition according to the invention in amounts of up to, for instance, 40 wt. % results in scratch resistant homogeneous mat coatings.

Examples of suitable saturated and unsaturated acrylates are polyurethane (meth)acrylates, polyester (meth)acrylates, polyether (meth)acrylates and/or polyepoxy (meth)acrylates.

WO-A-9319132 discloses a powder paint binder composition comprising an unsaturated polyester and an oligomer having a plurality of allyl groups. Preferably the oligomer is an allylether ester or an allylether urethane. WO-A-9319132 does not disclose and does not indicate a crosslinker comprising prepolymer units.

The invention will be elucidated on the basis of the following non-limiting examples.

Experiment 1

Preparation of Unsaturated Polyester

A 4-liter round-bottom flask provided with a thermometer, stirrer and distillation head was filled with 98.6 g of trimethylol propane, 1,014 g of neopentyl glycol and 1.1 g of butylchlorotin dihydroxide. While a constant nitrogen flow was supplied, the temperature was raised to 175° C., after which 1,204 g of terephthalic acid was added. The temperature was then raised to 220° C. in 2 hours, with water being distilled off. After an acid number lower than 100 mg KOH/g of resin had been reached, the reaction mixture was cooled to 140° C.

Subsequently 255 g of fumaric acid, 1.1 g of butylchlorotin dihydroxide and 0.3 g of monotertiary butylhydroquinone were added, following which the temperature was raised to 215° C. until the acid number was lower than 12 mg KOH/g of resin. The reaction mixture was cooled to 180° C. and placed in a vacuum for one hour.

The resulting polyester had an Mn (theor.) of 3000, a WPU of 1000 g resin/mole of unsaturated group, a hydroxy number of 62 mg KOH/g of resin, a Tg of 49° C. (Mettler, TA 3.000 at: 10° C./min.) and a viscosity of 110 dPas (Emila, 165° C.).

Experiment 2

Preparation of Crosslinker

The reaction of a crystalline prepolyester on the basis of 104 g of terephthalic acid and 96 g of hexane diol with 60 g of 1,6-hexamethylene diisocyanate and 40.3 g of hydroxy butylvinyl ether in the presence of dibutyltin dilaurate at 110° C. in toluene resulted in a crystalline crosslinker having a melting point of 123° C. and a WPU of 865.

Experiment 3

Preparation of Crosslinker

The reaction of a crystalline prepolyester on the basis of 41 g of ethylene glycol and 96 g of dodecane dicarboxylic acid with 44 g of 1,6-hexamethylene diisocyanate and 29.4 g of hydroxy butylvinyl ether in the presence of dibutyltin dilaurate at 110° C. in toluene resulted in a crystalline crosslinker having a melting point of 80° C. and a WPU of 1081.

EXAMPLE I

Preparation of Powder Coating 108 g of polyester according to Experiment 1, 92 g of crosslinker according to Experiment 2, 2 g of Irgacure 184™ and 2 g of Resiflow PV 5 (flow additive) were homogeneously mixed in a prism extruder at 70° C. and 200 rpm. After cooling the paint was ground and sieved, the fraction having a particle size lower than 90 $\mu$m being applied, in a layer thickness of about 100 $\mu$m, on an aluminum panel by means of an electrostatic spraying device. The resulting powder coating was heated at 120° C. for 70 seconds by means of IR lamps, so that the powder layer melted. The panel, which was still warm, was cured by means of UV radiation (1 J/cm$^2$, measured using an IL 390 light bug, standard Mercury arc lamp).

The resulting coating had a good flow (visually determined), a good acetone resistance (no damage after 100 acetone double rubs), an impact resistance of 60 inch pound (ASTM-2794/69), an adhesion GT 0 (Gitterschnitt test, ISO 2409/DIN 53151), an ESP (ISO 1520/DIN 53156) of greater than 6.0 mm, a pendulum hardness (ISO 1522/DIN 53157) of 101 seconds an a gloss (ASTM-D-523/70) of 82 at 20° and 96 at 60°.

EXAMPLE II

Preparation of Powder Coating 144 g of polyester according to Experiment 1, 156 g of crosslinker according to Experiment 3, 3 g of Irgacure™ and 3 g of Resiflow PV 5 (flow additive) were homogeneously mixed in a prism extruder at 70° C. and 200 rpm. After cooling the paint was ground and screened, the fraction having a particle size lower than 90 $\mu$m being applied, in a layer thickness of about 50 $\mu$m, on an aluminum panel by means of an electrostatic spraying device. The resulting powder coating was heated at 120° C. for 60 seconds by means of IR lamps, so that the powder layer melted. The panel, which was still warm, was cured by means of UV radiation (1 J/cm$^2$, measured using an IL 390 light bug, standard Mercury arc lamp).

The resulting coating had a good flow (visually determined.), a good acetone resistance (no damage after 100 acetone double rubs), an impact resistance of 60 inch pound (ASTM-2794/69) and an adhesion GT 0.

Experiment 4

Preparation of Vinyl Ether Functionalized Crosslinking Agent

A 4-liter cylindrical reactor was provided with a thermometer, a stirrer, and a reflux condenser and filled with 3.3. moles of 1,6-hexanediisocyanate, 2.1. milimoles of dibutyl tin laurate, and 1,980 ml of chloroform. While supplying a constant flow of nitrogen to the vessel, 6.6. moles of 4-hydroxybutyl vinyl ether were added dropwise over the course of about 3 hours, during which time the reaction mixture was heated to about 55° C. After about 8 hours, a sediment had formed, which was filtered, washed with hexane, and dried under vacuum.

The reaction product had a melting range of about 90–108° C., which was measured using a Mettler TA 3000 System and a heating rate of 5° C./min.

EXAMPLES III–IV and COMPARATIVE EXAMPLE A

Preparation of a Powder Coating

The polyester according to Experiment 1, the crosslinker according to Experiment 2 and the crosslinker according to Experiment 4 were mixed in ratios as indicated in Table I and they were mixed with 2 g of Irgacure 184™ and 2 g of Resiflow PV 5™ (flow additive) homogeneously in a prism extruder at 70° C. and 200 rpm. After cooling the paint was ground and sieved, the fraction having a particle size lower than 90 μm being applied, in a layer thickness of about 100 μm, on an aluminium panel by means of an electrostatic spraying device. The resulting powder coating was heated at 120° C. for 70 seconds by means of IR lamps, so that the powder layer melted. The panel, which was still warm, was cured by means of UV radiation (1 J/cm$^2$, measured using an IL 390 light bug, standard Mercury arc lamp).

TABLE I

| Example | UPE[1] .EXP. 1 (gram) | Crossl. Exp. 2 (gram) | Crossl. Exp. 4 (gram) | ADR[2] | REV[3] IMP | ADH[4] | ESP[5] (mm) | Hard-[6] ness (mm) |
|---|---|---|---|---|---|---|---|---|
| III | 129.8 | 56.6 | 13.6 | >100 | 20 | 0 | >6.0 | 144 |
| IV | 117.4 | 76.6 | 6.0 | >100 | 40 | 0 | >6.0 | 112 |
| A | 166.0 | 0 | 34.0 | >100 | <4 | 5 | 5.3 | 195 |

[1]unsaturated polyester
[2]acetone double rubs
[3]reversed impact test: ASTM-2794/69 on aluminium
[4]cross-hatch adhesion: ISO2409/DIN5315
[5]Erichsen Slow Penetration: ISO1520/DIN53156
[6]Pendulum hardness

EXAMPLES V–VII

Preparation of Powder Coating 108 g of polyester according to Experiment 1, 92 g of crosslinker according to Experiment 2 g, 30 g of an acrylate as indicated in Table II, 2 g of Irgacure 184™ and 2 g of Resiflow PV 5™ (flow additive) were homogeneously mixed in a prism extruder at 70° C. and 200 rpm. After cooling the paint was ground and sieved, the fraction having a particle size lower than 90 μm being applied, in a layer thickness of about 100 μm, on an aluminium panel by means of an electrostatic spraying device. The resulting powder coating was heated at 120° C. for 70 seconds by means of IR lamps, so that the powder layer melted. The panel, which was still warm, was cured by means of UV radiation (1 J/cm$^3$, measured using an IL 390 light bug, standard Mercury arc lamp).

The resulting coatings had a scratch resistant homogeneous matt surface (see Table II), a good flow (visually determined) and a good acetone resistance.

TABLE II

| Example | Acrylate | Gloss 20° | Gloss 60° |
|---|---|---|---|
| V | Johncryl 587 (Johnson Polymers) | 11 | 39 |
| VI | SCX 804 (Johnson Polymers) | 16 | 52 |
| VII | Unsaturated Acrylate[1] | 2 | 8 |

[1]the unsaturated acrylate comprises units of hydroxyethylacrylate, trimethylolpropane and isophoronediisocyanate in a molar ratio 3:1:3

1) the unsaturated acrylate comprises units of hydroxyethylacrylate, trimethylolpropane and isophoronediisocyanate in a molar ratio 3:1:3

What is claimed is:

1. A powder paint binder composition comprising:
    a) a polymer with an amount of unsaturation such that the ratio (polymer weight)/(number of unsaturated groups) is between 300 and 1800 g per mole of unsaturated group (WPU) and with a molecular weight (Mn) of between 800 and 5000 g per mole and
    b) a crosslinker comprising the reaction product of a prepolymer having a molecular weight (Mn) higher than 400 and a functionalised vinyl ether, the number of polymerizable unsaturations of the crosslinker being higher than or equal to 2.

2. Composition according to claim 1, wherein the polymer a) is an unsaturated polyester and/or an unsaturated polyacrylate.

3. A binder composition according to claim 1 wherein the prepolymer is a hydroxyl functional prepolymer, an acetoacetate functional prepolymer, an epoxy functional prepolymer, an acid functional prepolymer, an isocyanate functional prepolymer or an ester functional prepolymer.

4. A powder paint binder composition according to claim 1 wherein the crosslinker comprises the reaction product of a hydroxy functional prepolymer, a (poly)isocyanate and a functionalised vinyl ether, the number of polymerizable unsaturations of the crosslinker being higher than or equal to 2.

5. Composition according to claim 1, wherein the crosslinker comprises the reaction product of a hydroxyfunctional prepolymer, a (poly)isocyanate and a vinyl ether.

6. A binder composition according to claim 1, wherein the vinylether is a hydroxyvinylether or an aminovinylether.

7. Composition according to claim 1, wherein the prepolymer is a polyester or a polyacrylate having a hydroxyl number of between 25 and 150 mg KOH/g of resin.

8. Composition according to claim 4, wherein the isocyanate is 3,4-isocyanate methyl-1-methyl cyclohexyl isocyanate (IMCI), isophorone diisocyanate (IDPI) or 1,6-hexamethylene diisocyanate (HDI).

9. Powder paint binder composition comprising
a) a polymer with an amount of unsaturation such that the ratio (polymer weight)/(number of unsaturated groups) is between 300 and 1800 g per mole of unsaturated group (WPU) and with a molecular weight (Mn) of between 800 and 5000 g per mole,
b) a crosslinker comprising the reaction product of a hydroxy-functional prepolymer, a (poly)isocyanate and a functionalised vinyl ether, the number of polymerizable unsaturations of the crosslinker being higher than or equal to 2 and
c) a further crosslinker comprising ethylenically unsaturated groups.

10. Powder paint binder composition according to claim 9 wherein crosslinker c) is a crosslinker comprising ethylenically unsaturated groups selected from the group consisting of vinyl ether, vinylester and (meth)acrylate functional groups.

11. Powder paint comprising a binder composition according to claim 1.

12. Powder coating obtained by curing of a powder paint according to claim 11.

13. Wholly or partly coated substrate, wherein as coating use is made of a powder coating according to claim 12.

14. Substrate according to claim 13, wherein the substrate is metal or wood.

* * * * *